Dec. 20, 1932.                S. SAK                 1,891,841
                YEAST PROPOGATION CONTROLLING METHOD
                       Filed Dec. 20, 1927
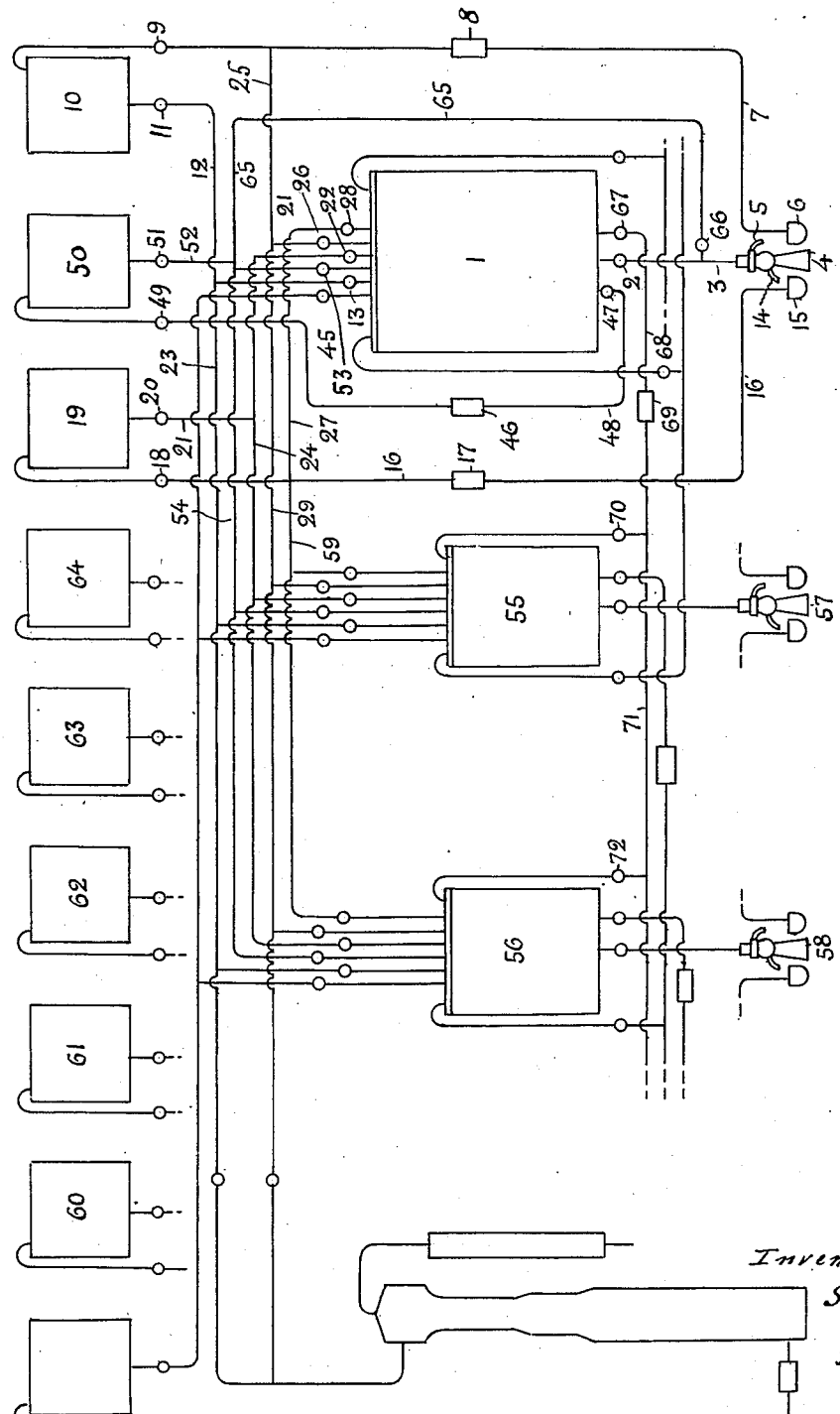

Patented Dec. 20, 1932

1,891,841

UNITED STATES PATENT OFFICE

SØREN SAK, OF CHARLOTTENLUND, DENMARK

YEAST PROPAGATION CONTROLLING METHOD

Application filed December 20, 1927, Serial No. 241,393, and in Norway January 8, 1927.

This invention relates to a method of producing yeast, principally compressed yeast and especially air-grown yeast, with or without the production of alcohol. The process is applicable to the production of compressed yeast and also to the production of the seed yeast and mother yeast used in the manufacture of compressed yeast. For the production of the wort used for the propagation, the raw materials generally used in the manufacture of compressed yeast are used, or mixtures of such.

In a method of propagating yeast in a propagating wort simultaneously in two or more vats, yeast originating from yeast-containing wort withdrawn from one vat is indirectly returned to the same vat, viz. through one or more of the other vats containing propagating wort, which circulation can be continued. The transfer of yeast from one vat to another can be effected by transferring yeast in any form. In at least one of the propagating vats in the system the actual concentration of nutrients and/or metabolic products and/or non-fermentable substances, and/or salts, must be higher than the actual concentration of the same substances in the initial vat. This applied particularly to the sugar concentration. Thus, in at least one of the propagating vats in the system containing wort, the actual sugar concentration is higher than that of the wort in the initial vat. Often liquid yeast is separated by centrifuging (or otherwise) yeast-containing wort withdrawn (yeast-cream), and the transfer can then be effected by transferring this separated yeast or yeast obtained therefrom by pressing. The transfer can also be effected by transferring yeast in the form of yeast-containing wort, and then the process is identical with the embodiment indicated in the following example.

By returning at a certain moment to a propagating wort yeast which at a previous moment has been withdrawn from the said propagating wort, a rejuvenation of the propagation occurs, that is to say, a rejuvenating factor is introduced, viz. a yeast, the grade of generation of which is lower than that in the propagating wort immediately before the return. Thus the return counteracts a rapid increase of the grade of generation; owing to the return the increase of grade of generation occurs more steadily. Those acquainted with the dangers and the risk attached to the use of high generations will appreciate the importance of returning centrifuged yeast, solely by considering the condition of generations.

Besides adding the yeast to the different vats in the manner indicated above yeast developed outside the system can be added to the vats. In using either of these processes a certain quantity by weight of yeast per unit volume wort is established in the vats. Yeast can be added to a vat from a preceding or a succeeding vat.

The weight of yeast per unit volume of wort is of vital importance to the progress of a propagation process, and this factor is essentially of the importance to the processes using continuous withdrawal and continuous addition in which yeast-containing wort is withdrawn and fresh wort simultaneously added.

Even if return of yeast acts as a control, which alters the increase of the grade of generation from an abrupt and rapid increase to a steady and slow increase it is obvious that an increase of the grade of generation is unavoidable in a propagation process. Therefore, when the propagation has been continued for a certain time, if the symptoms of propagation, for instance tendency of flocculation, make it desirable, fresh yeast in one form or other developed outside the system may be added to the propagating wort and thus yeast may be added in the form of centrifuged yeast or compressed yeast, or as yeast in any other form including yeast-containing wort.

It is of consequence to the progress of the propagation that the transfer of yeast to another vat, or addition to a propagation wort of yeast developed outside the system, be controlled systematically in such a manner that during the propagation a certain weight of yeast per unit volume of wort is established for a short or long period of time.

With an established certain weight of yeast per unit volume of wort, a sample of wort withdrawn or the yeast-containing wort, which is led to the centrifugal machines, will prove to be incompletely propagated and then generally contains alcohol. With a certain greater amount of yeast per unit volume of wort, the yeast-containing wort, which is led to the centrifugal machines, is completely propagated and contains alcohol. A further increase of the weight of yeast per unit volume of wort causes in aerated propagating wort of suitable dilution a more or less complete disappearance of the alcohol, so that the yeast-containing wort, which is led to the certrifugal machines, is free or practically free from alcohol.

Since during the propagation fresh wort or other nutrients, centrifuged wort, solutions of chemicals, or water, may be added, it will appear from what is stated above, that the process occurs in such a manner that the transfer of the yeast from one propagation wort to another and from this other, if desired, to one or more other vat or vats, with propagating wort, is controlled, or controlled addition is made to one or more of these vats of yeast developed outside the system, in such a manner that during the circulation in at least one of the vats containing propagating wort a certain weight of yeast per unit volume of wort is established during the propagation for a short or long time, this weight of yeast being kept constant during the propagation for a short or long period of time, or practically constant, or caused to rise or fall from a present to another desired amount of yeast per unit volume of wort. The weight of yeast per unit volume of wort thereby established may be such that the yeast-containing wort, which is led to the centrifugal machines, is completely propagated, or such, that it contains alcohol, or the weight of yeast per unit volume of wort may be such that during the propagation for a short or long time alcohol is either not formed or formed only in such small quantities, that the alcohol will wholly or partly disappear, so that the yeast-containing wort, which is led to the centrifugal machines, is free or practically free from alcohol.

Part of or the whole quantity of the centrifuged yeast may be separated from the wort by pressing.

The process can be used in combination with any of the methods, known per se, in which during the propagation fresh wort or nutrient solution is added.

As already stated, for the production of the wort used for the propagation the raw materials generally used in the manufacture of compressed yeast may be used; the ordinary auxiliary substances such as salts, especially phosphates, may also be used. as also ammonium salts, potassium compounds, magnesium compounds and the like, and sulphuric acid and ammonium.

The following example serves to illustrate the invention, but the invention is not restricted thereto:—

In each vat of a system of vats in series mutually connected in such a manner that yeast-containing wort can flow from one vat to another, seed yeast in a quantity of 30 kilos per cubic meters of wort is sown in a solution of molasses of 1,8° Balling, such a great volume of wort being used as the vat can contain under strong aeration, generally 100 cubic meters of air per hour per cubic meter of wort. When the propagating wort in the different vats is practically fully propagated a solution of molasses of 1,5° Balling is led to the first vat in the series, whereafter yeast-containing wort is continuously withdrawn from the last vat in the series and separated into yeast free wort and liquid yeast, (separated yeast, yeast cream) which latter is transferred to the first vat in the series. From the first vat to the second vat the yeast is transferred in the form of yeast-containing wort and in the same manner from the second vat to the third vat and so on until the yeast in consequence of the circulation has returned to the initial vat which circulation is continued. The amount of solution of molasses is so proportioned that the wort is completely exhausted when it is withdrawn from the last vat in the series. The temperature is maintained at about 30° C. The aeration is as indicated above. In the first vat in the series the quantity by weight of yeast per unit volume of wort is caused to increase to about 0,040 grams yeast per litre, which quantity by weight per unit volume is kept constant in the first vat in the series. In the following vats the quantity by weight of yeast per unit volume of wort gradually increases to about the said value.

According to other methods of carrying out this invention nutrient solution can also be added to more vats as well as yeast can be transferred from one vat to another in the form of centrifuged yeast or of yeast in any other form. The wort added may be of a lower or higher concentration, and it must be noticed that the question of establishing an increasing, constant or decreasig quantity by weight of yeast per unit volume of wort is dependent on the quantity by weight of yeast present per unit volume of wort, on the amount of yeast produced in a certain period of time and on the concentration and the volume of the nutrient solution added during the said period. If yeast from outside is added this will of course also influence the weight of yeast per unit volume of wort.

In order to make this clear the following statement is given.

If addition to the vat takes place during the propagation and if the addition only consists in addition of nutrient solution or yeast free liquid in general it is evident, that the condition for maintaining a constant quantity by weight of yeast per unit volume of wort in a certain short period will be fulfilled if the amount of yeast formed in a vat during the said period divided by the volume of liquid added during the period is equal to the quantity by weight of yeast per unit volume of propagating wort present in the vat immediately before the beginning of the period. If this latter quantity is called $d$ while the quantity of yeast formed in the vat during the period is called $q$ and the volume of liquid added during the period $v$, the condition for the maintenance of a constant quantity by weight of yeast per unit volume of propagating wort will be determined by the expression $$\frac{q}{v} = d \quad (I)$$

If besides addition of solution addition of yeast in the form of centrifuged yeast or yeast in any other form, for instance compressed yeast, if desired mixed with water, to the vat takes place, the conditions indicated above hold good with the difference that the condition for the maintenance of a constant quantity by weight of yeast per unit volume of wort in a certain short period is fulfilled when the sum of the quantity $q_1$ of yeast formed in the vat during the period and the quantity $q_2$ of yeast added to the vat during the period divided by the sum of the volume $v_1$ of nutrient solution and the volume $v_2$ of centrifuged yeast or yeast in any other form added during the period is equal to the quantity $d$ by weight of yeast per unit volume of propagating wort present in the vat immediately before the beginning of the period. The condition for the maintenance of the constant quantity $d$ by weight of yeast per unit volume of propagating wort is determined by the expression $$\frac{q_1 + q_2}{v_1 + v_2} = d \quad (II)$$

In a fermentation according to the equation (II), i. e. a fermentation in which addition to the vat takes place only of yeast free solution, the increase of the quantity of yeast produced in the vat in the course of a certain short period of time will be identical with the quantity of yeast formed in the vat in the said period. This quantity is, all other conditions being equal, especially the temperature and intensity of aeration, dependent on the amount of nutrient consumed by the yeast in the said period. The quantity of nutrient consumed may partly comprise the nutrients which have been present in the propagating wort prior to the beginning of the period and partly the nutrients contained in the solution of nutrient added. The more the wort in the course of the propagation approaches to be constantly completely fermented, the more the quantity of nutrients consumed will originate from the nutrient solution added, and if the propagating wort constantly be completely fermented the quantity of nutrient consumed will practically exclusively originate from the nutrient solution added.

The propagation is often carried through in such a manner that the last condition is fulfilled and in this case, all other conditions being equal, it will be the quantity of nutrient contained in the volume $v$ or in other words the concentration of the wort added which is conclusive for the quantity $q$ of yeast formed.

If in the course of the period the volume $v$ is added, the supposition indicated above being fulfilled, a constant quantity $d$ by weight of yeast per unit volume of wort will be maintained in the propagating wort when the volume $v$ contains a quantity of nutrient sufficient to make possible the formation in the course of the period of the quantity $q$ of yeast determined by the equation $$q = v \cdot d$$

If a greater quantity of nutrient is contained and, all other conditions being still equal, if this quantity be converted to a quantity of yeast greater than $q$, the contents of yeast in the wort per unit volume will increase.

If a smaller quantity of nutrient is contained and, all other conditions being still equal, if this quantity be converted to a quantity of yeast smaller than $q$, the contents of yeast in the wort per unit volume will decrease.

If the yeast returned or added from outside is added in the form of centrifuged yeast with a high content of yeast and if the concentration of the nutrient solution added is low, that is the volume per unit weight of nutrient contained therein great, $v_2$ will be small compared with $v_1$, and therefore no great error is made if instead of the expression given above the following expression is used $$\frac{q_1 + q_2}{v_1} = d \quad (III)$$

which expression therefore can be considered applicable for a provisional control; $d$ and $v_1$ must be known. As a value for $q_1$ the corresponding value for the preceding period can be used, which is warrantable when other circumstances, such as temperature wort concentration, intensity of aeration or the like, have not been altered. $q_2$ can then be computed for use in the control.

By an increasing or decreasing quantity by weight of yeast per unit volume of wort an augmentation of the velocity with which the yeast-containing wort is withdrawn from the vat will augment the increase or decrease respectively, whereas a reduction of the velocity with which yeast-containing wort is withdrawn reduces the increase or decrease respectively.

The more frequently the quantity of yeast formed per unit of time is ascertained on the basis of ascertainments of the volume of yeast-containing wort and the volume of centrifuged yeast and the contents of yeast per unit volume in the said volumes, and the more frequently the transfer or addition of yeast or the velocity with which yeast-containing wort is withdrawn is controlled, the more exactly the quantity of yeast per unit volume of wort in the propagating wort can be controlled.

Under the expression "addition of yeast" is comprised addition of yeast in any form whatever: liquid yeast, "yeast cream", compressed yeast, in some cases mixed with for instance water, fermenting wort, yeast-containing wort, etc.

The expression "aqueous liquor" comprises fresh wort, solutions of nutrients in general whether organic or inorganic, centrifuged yeast whether originating from a fermenting wort, which is partly or fully fermented, distilled wort whether the alcohol is distilled in vacuum or under ordinary pressure, and whether the distillation has been carried out at higher or lower temperatures, and whether it is thereby fully or partly divested of alcohol, solutions of acids or salts or inorganic or organic substances in general. It is further remarked that whereas the expression "solutions of nutrients" of course primarily refers to substances which are consumed by the yeast there is no objection to the solutions of nutrients being able to act further as diluting agents for the yeast in the wort, and under the expression "diluting agents" are comprised substances, which dilute the solutions of nutrients present and the amount of yeast present, whether in the diluting agents greater or smaller quantities of nutrients are contained, or—as is the case with water—nutrients or but quite small quantities of the same (salts) are not contained.

The diagrammatic view shown in the present drawing serves as an illustration of the method described above and of the apparatus necessary for the carrying out of the process, with appurtenant pipings, pumps and centrifugal machines; presses and aeration devices, however, being left out for sake of clearness, also centrifugal machines, pipings and pumps for transfer of centrifuged wort and yeast cream, and pipings and pumps for transition of propagating wort to storage vats are only shown in connection with one of the propagation vats for sake of a general view, the arrangement as regards the other propagation vats being exactly similar. Further, it must be observed that the system may comprise more propagation vats than shown in the drawing.

During the propagation in the propagation vat 1 propagating wort is withdrawn through the valve 2 and is led through the pipe 3 to the centrifugal machine 4, where it is separated into centrifuged wort, which through the discharge-pipe 5 is discharged into the container 6, and into yeast-cream, which through the discharge-pipe 14 is discharged into the container 15. From the container 6 the wort is by means of the pump 8 led through the pipe 7 either through the valve 9 to the storage vat 10 for centrifuged wort or through the pipe 25 and the valve 26 back to the initial vat 1 or further through the pipe 29 to the other propagation vats 55 and 56. From the storage vat 10 the centrifuged wort is led through the valve 11 either through the pipe 12 and the valve 13 back to the initial vat 1 or through the pipes 12, 23 to the other propagation vats 55 and 56. From the container 15 the yeast cream is by means of the pump 17 led through the pipe 16 either through the valve 18 to the storage vat 19 for yeast cream or through the pipe 27 and the valve 28 back to the initial vat 1. From the storage vat 19 the yeast cream is led through the valve 20, the pipe 21 and the valve 22 back to the initial vat 1 or through the pipes 21, 24 to the other propagation vats 55 and 56.

Part of or the whole of the yeast cream gained from part of or the whole of the propagating or fermented wort withdrawn for instance from the propagation vat 1 during or after the propagation, is during the part of the propagation or during the whole propagation by means of the pump 17 led through the pipes 16, 59 to the various propagation vats 55 and 56, in which is found propagating or non-propagating wort, the nature of which in one or more respects is different from that of the wort in the initial vat 1, in order, after the cells in these vats have displayed a more or less intense activity of growth, and after propagating or fermented wort from these vats, by means of the centrifugal machines 57 and 58 respectively, have been separated into yeast and wort in the form of yeast as far as possible divested of adherent wort, to be returned to the initial vat continuously or intermittently during part of the propagation or during the whole propagation, which circulation may be continued.

The yeast-containing wort can from the propagation vat 1 by means of the pump 46 be led to the storage vat 50 through the valve 47, the pipe 48 and the valve 49. From the storage vat 50 yeast-containing wort can be returned to the propagation vat 1 through the valve 51, the pipe 52 and the valve 53, or to the other propagation vats through the pipe 54, or to the centrifugal machine 4 through the pipe 65 and the valve 66. The yeast-containing wort can also from the propagation vat 1 by means of the pump 69 through the valve 67, the pipe 68 and the valve 70, be led to the propagation vat 55 or further through the pipe 71 and the valve 72 to the propagation vat 56.

The storage vats 60 and 61 serve for accommodation of fresh wort and molasses, whereas the storage vats 62, 63, 64 and other containers, which are not shown in the drawing, serve for accommodation of water, ammonium sulphate, ammonia water and other chemicals.

Having thus fully described my invention I claim as new and desire to secure by Letters Patent:

1. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream and adding fresh wort to the initial vat, which circulation can be continued.

2. In a method of propagating yeast in a propagating wort simultaneously in more than two vats, withdrawing yeast-containing wort from one of the said vats, separating yeast-cream from the said withdrawn wort, transferring at least part of the yeast-cream to another vat the actual sugar concentration of which is higher than the actual sugar concentration in the initial vat, withdrawing yeast-containing wort from this vat, separating yeast-cream from the wort withdrawn from the last named vat and transferring the yeast-cream thus obtained to a third vat and so on to the following vat, if any, continuously returning a definite proportion of the yeast-cream obtained from the last vats, to which yeast-cream and fresh wort has been transferred, to the initial vat, which circulation can be continued.

3. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream and adding fresh wort to the initial vat, which circulation can be continued, and adding yeast to at least one of the vats.

4. In a method of propagating yeast in a propagating wort simultaneously in more than two vats, withdrawing yeast-containing wort from one of the said vats, separating yeast-cream from the said withdrawn wort, transferring at least part of the yeast-cream to another vat the actual sugar concentration of which is higher than the actual sugar concentration in the initial vat, withdrawing yeast-containing wort from this vat, separating yeast-cream from the wort withdrawn from the last named vat and transferring the yeast-cream thus obtained to a third vat and so on, to the following vats, if any, continuously returning a definite proportion of the yeast-cream obtained from the last vat, to which yeast-cream and fresh wort has been transferred, to the initial vat, which circulation can be continued, and adding yeast to at least one of the vats.

5. In a method of propagating yeast simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream and adding fresh wort to the initial vat, which circulation can be continued, and separating by pressing at least part of the yeast from at least one of the said two vats.

6. In a method of propagating yeast in a propagating wort simultaneously in more than two vats, withdrawing yeast-containing wort from one of the said vats, separating yeast-cream from the said withdrawn wort, transferring at least part of the yeast-cream to another vat the actual sugar concentration of which is higher than the actual sugar concentration in the initial vat, withdrawing yeast-containing wort from this vat, separating yeast-cream from the wort withdrawn from the last named vat and transferring the yeast-cream thus obtained to a third vat and so on, to the following vats, if any, continuously returning a definite proportion of the yeast-cream obtained from the last vat, to which yeast-cream and fresh wort has been transferred, to the initial vat, which circulation can be continued, at least part of the yeast from and separating by pressing at least one of the said vats in series.

7. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning at least part of the yeast-cream and adding fresh wort to the initial vat, which circulation can be continued, maintaining a substantially constant weight of yeast per unit volume of propagating wort in at least one of the said vats, and simultaneously adding an aqueous liquor to the vat in question.

8. In a method of propagating yeast in a propagating wort simultaneously in more than two vats, withdrawing yeast-containing wort from one of the said vats, separating yeast-cream from the said withdrawn wort, transferring at least part of the yeast-cream to another vat the actual sugar concentration of which is higher than the actual sugar concentration in the initial vat, withdrawing yeast-containing wort from this vat, separating yeast-cream from the wort withdrawn from the last named vat and transferring the yeast-cream thus obtained to a third vat and so on, to the following vats, if any, continuously returning a definite proportion of the yeast-cream obtained from the last vat, to which yeast-cream and fresh wort has been transferred, to the initial vat, which circulation can be continued, maintaining a substantially constant weight of yeast per unit volume of propagating wort in at least one of the vats, and simultaneously adding an aqueous liquor to the vat in question.

9. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream adding fresh wort to the initial vat, which circulation can be continued, and establishing an increasing weight of yeast per unit volume of propagating wort in at least one of the vats.

10. In a method of propagating yeast in a propagating wort simultaneously in more than two vats, withdrawing yeast-containing wort from one of the said vats, separating yeast-cream from the said withdrawn wort, transferring at least part of the yeast-cream to another vat, withdrawing yeast-containing wort from this vat the actual sugar concentration of which is higher than the actual sugar concentration in the initial vat, separating yeast-cream from the wort withdrawn from the last named vat and transferring the yeast-cream thus obtained to a third vat and so on, to the following vats, if any, continuously returning a definite proportion of the yeast-cream obtained from the last vat, to which yeast-cream and fresh wort has been transferred, to the initial vat, which circulation can be continued, and establishing an increasing weight of yeast per unit volume of propagating wort in at least one of the vats.

11. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream and adding fresh wort to the initial vat, which circulation can be continued, establishing a decreasing weight of yeast per unit volume of propagating wort in at least one of the vats, and simultaneously adding an aqueous liquor to the vat in question.

12. In a method of propagating yeast in a propagating wort simultaneously in more than two vats, withdrawing yeast-containing wort from one of the said vats, separating yeast-cream from the said withdrawn wort, transferring at least part of the yeart-cream to another vat the actual sugar concentration of which is higher than the actual sugar concentration in the initial vat, withdrawing yeast-containing wort from this vat, separating yeast-cream from the wort withdrawn from the last named vat and transferring the yeast-cream thus obtained to a third vat and so on, to the following vats, if any, continuously returning a definite proportion of the yeast-cream obtained from the last vat, to which yeast-cream and fresh wort has been transferred, to the initial vat, which circulation can be continued, esablishing a decreasing weight of yeast per unit volume of propagating wort in at least one of the vats, and simultaneously adding an aqueous liquor to the vat in question.

13. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream and adding fresh wort to the initial vat, which circulation can be continued, controlling the weight of yeast per unit volume of propagating wort in at least one of the vats to cause germination of a large percentage of yeast cells.

14. In a method of propagating yeast in a propagating wort simultaneously in more than two vats, withdrawing yeast-containing wort from one of the said vats, separating yeast-cream from the said withdrawn wort, transferring at least part of the yeast-cream to another vat the actual sugar concentration of which is higher than the actual sugar concentration in the initial vat, withdrawing yeast-containing wort from this vat, separating yeast-cream from the wort withdrawn from the last named vat and transferring the yeast-cream thus obtained to a third vat and so on to the following vats, if any, continuously returning a definite proportion of the yeast-cream obtained from the last vat, to which yeast-cream and fresh wort has been transferred, to the initial vat, which circulation can be continued, controlling the weight of yeast per unit volume of propagating wort in at least one of the vats to cause germination of a large percentage of yeast cells.

15. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream and adding fresh wort to the initial vat, which circulation can be continued, and controlling the weight of yeast per unit volume of propagating wort in at least one of the vats so as to effect substantially full propagation of the withdrawn yeast-containing wort.

16. In a method of propagating yeast in a propagating wort simultaneously in more than two vats, withdrawing yeast-containing wort from one of the said vats, separating yeast-cream from the said withdrawn wort, transferring at least part of the yeast-cream to another vat the actual sugar concentration of which is higher than the actual sugar concentration in the initial vat, withdrawing yeast-containing wort from this vat, separating yeast-cream from the wort withdrawn from the last named vat and transferring the yeast-cream thus obtained to a third vat and so on, to the following vats, if any, continuously returning a definite proportion of the yeast-cream obtained from the last vat, to which yeast-cream and fresh wort has been transferred, to the initial vat, which circulation can be continued, and controlling the weight of yeast per unit volume of propagating wort in at least one of the vats so as to effect substantially full propagation of the withdrawn yeast-containing wort.

17. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream and adding fresh wort to the initial vat, which circulation can be continued, and controlling the weight of yeast per unit volume of propagating wort in at least one of the vats so as to cause the withdrawn wort to be alcohol-containing.

18. In a method of propagating yeast in a propagating wort simultaneously in more than two vats, withdrawing yeast-containing wort from one of the said vats, separating yeast-cream from the said withdrawn wort, transferring at least part of the yeast-cream to another vat the actual sugar concentration of which is higher than the actual sugar concentration in the initial vat, withdrawing yeast-containing wort from this vat, separating yeast-cream from the wort withdrawn from the last named vat and transferring the yeast-cream thus obtained to a third vat and so on, to the following vats, if any, continuously returning a definite proportion of the yeast-cream obtained from the last vat, to which yeast-cream and fresh wort has been transferred, to the initial vat, which circulation can be continued, and controlling the weight of yeast per unit volume of propagating wort in at least one of the vats so as to cause the withdrawn wort to be alcohol-containing.

19. In a method of propagating yeast in a propagating wort simultaneously in two vats, withdrawing yeast-containing wort from the propagating wort in one of the said vats, separating yeast-cream from the said withdrawn wort, transferring at least part of the said yeast-cream to the propagating wort in the other vat the actual sugar concentration of which is higher than the actual sugar concentration in the initial vat, withdrawing yeast-containing wort from the last named propagating wort, separating yeast-cream from this withdrawn wort and continuously returning a definite proportion of the yeast-cream and adding fresh wort to the initial vat, which circulation can be continued, and controlling the weight of yeast per unit volume of propagating wort in at least one of the vats so as to cause the withdrawn wort to be practically alcohol-free.

20. In a method of propagating yeast in a propagating wort simultaneously in more than two vats, withdrawing yeast-containing wort from one of the said vats, separating yeast-cream from the said withdrawn wort, transferring at least part of the yeast-cream to another vat the actual sugar concentration of which is higher than the actual sugar concentration in the initial vat, withdrawing yeast containing wort from this vat, separating yeast-cream from the wort withdrawn from the last named vat and transferring the yeast-cream thus obtained to a third vat and so on to the following vats, if any, returning a definite proportion of the yeast-cream obtained from the last vat, to which yeast-cream and fresh wort has been transferred, to the initial vat, which circulation can be continued, and controlling the weight of yeast per unit volume of propagating wort in at least one of the vats so as to cause the withdrawn wort to be practically alcohol-free.

21. A continuous-addition continuous-withdrawal process of propagating yeast in a propagating wort, simultaneously in more than two vats, comprising establishing and maintaining a circulation of a total bulk of yeast-drawing material in two or more separate quantities travelling in series in successive stages of yeast growth in the vats, by continuous addition and continuous withdrawal of material, and by individual control of yeast environment in the first of said separate quantities, including continuous additions of yeast-nutrient, to maintain constant the quality of the final yeast.

22. A continuous-addition continuous-withdrawal process of propagating yeast comprising employing two or more vats in series communication, establishing and maintaining in each vat a growth of yeast of higher generation than that in the preceding vat by continuous additions of yeast-nutrient and continuously withdrawing the yeast-containing material from the last vat.

23. In a continuous addition-continuous withdrawal process of propagating yeast in which addition and withdrawal is controlled in such a manner that the weight of yeast per unit volume of propagating wort is increasing, the step of augmenting this increase by augmenting the rate of withdrawal and keeping constant the rate of addition.

24. In a continuous addition-continuous withdrawal process of propagating yeast in which addition and withdrawal is controlled in such a manner that the weight of yeast per unit volume of propagating wort is decreasing, the step of augmenting this decrease by augmenting the rate of withdrawal and keeping constant the rate of addition.

25. In a continuous addition-continuous withdrawal process of propagating yeast in which addition and withdrawal is controlled in such a manner that the weight of yeast per unit volume of propagating wort is increasing, the step of reducing this increase by reduction of the rate of withdrawal and keeping constant the rate of addition.

26. In a continuous addition-continuous withdrawal process of propagating yeast in which addition and withdrawal is controlled in such a manner that the weight of yeast per unit volume of propagating wort is decreasing, the step of reducing this decrease by reduction of the rate of withdrawal and keeping constant the rate of addition.

In testimony whereof I have affixed my signature.

SØREN SAK.

CERTIFICATE OF CORRECTION.

Patent No. 1,891,841. December 20, 1932.

SOREN SAK.

It is hereby certified that error appears in the printed specification of the above numbered patent requiring correction as follows: Page 8, after line 97, insert the following as claims 27 and 28:

27. In a method of propagating yeast in a propagating wort simultaneously in two vats, withdrawing yeast-containing wort from the propagating wort in one of the said vats, separating yeast-cream from the said withdrawn wort, transferring yeast-containing wort from the said withdrawn wort to the propagating wort in the other vat the actual sugar concentration of which is higher than the actual sugar concentration in the initial vat, withdrawing yeast-containing wort from the propagating wort in this last-named vat, separating yeast-cream from this last-named withdrawn wort and continuously returning yeast-containing wort and adding fresh wort to the initial vat, which circulation can be continued.

28. In a method of propagating yeast in a propagating wort simultaneously in more than two vats, withdrawing yeast-containing wort from one of the said vats, separating yeast-cream from the said withdrawn wort, transferring yeast-containing wort from the said withdrawn wort to the propagating wort in another vat the actual sugar concentration of which is higher than the actual sugar concentration in the initial vat, withdrawing yeast-containing wort from the propagating wort in this last-named vat, separating yeast-cream from the wort withdrawn from the last-named vat and transferring part of the yeast-containing wort thus obtained to the propagating wort in a third vat and so on to the following vat, if any, continuously returning part of the yeast-containing wort obtained from the last vat to which yeast-containing wort and fresh wort has been transferred, to the initial vat, which circulation can be continued.

And that the said Letters Patent should be read with this correction therein that the same may conform to the record of the case in the Patent Office.

Signed and sealed this 23rd day of May, A. D. 1933.

M. J. Moore.

(Seal) Acting Commissioner of Patents.